United States Patent
Stegman et al.

(10) Patent No.: US 7,940,164 B2
(45) Date of Patent: May 10, 2011

(54) METHOD FOR PROGRAMMING NEW SENSOR IN A MOTOR VEHICLE MONITORING SYSTEM

(75) Inventors: Jeffrey Stegman, Cincinnati, OH (US); Scott Comisar, Plano, TX (US)

(73) Assignee: Doran Manufacturing LLC, Cincinnati, OH (US)

( * ) Notice: Subject to any disclaimer, the term of this patent is extended or adjusted under 35 U.S.C. 154(b) by 328 days.

(21) Appl. No.: 12/268,862

(22) Filed: Nov. 11, 2008

(65) Prior Publication Data
US 2009/0121856 A1     May 14, 2009

Related U.S. Application Data

(60) Provisional application No. 60/987,084, filed on Nov. 11, 2007.

(51) Int. Cl.
*B60C 23/00* (2006.01)
(52) U.S. Cl. ....... 340/442; 340/447; 73/146.2; 116/34 R
(58) Field of Classification Search ................. 340/442, 340/445, 447; 73/146.4, 146.5, 146.2, 146; 116/34 R
See application file for complete search history.

(56) References Cited

U.S. PATENT DOCUMENTS

| | | | | |
|---|---|---|---|---|
| 6,693,522 B2 * | 2/2004 | Tang et al. | | 340/445 |
| 6,904,796 B2 * | 6/2005 | Pacsai et al. | | 73/146.8 |
| 2009/0033478 A1 * | 2/2009 | Deniau et al. | | 340/442 |

* cited by examiner

*Primary Examiner* — Toan N Pham
(74) *Attorney, Agent, or Firm* — Wm. Cates Rambo

(57) ABSTRACT

Data transmitted from a newly installed tire sensor is integrated into monitoring apparatus having data from previously integrated tire sensors stored therein. Each of the newly installed and previously integrated tire sensors periodically transmits a unique identification code. The method comprises placing the monitoring apparatus into a programming mode, entering the tire location of the newly installed tire sensor in the monitoring apparatus, entering a fraction of the identification code for the newly installed tire sensor in the monitoring apparatus, placing the monitoring apparatus in a comparing mode, transmitting the identification codes from the newly installed and previously integrated tire sensors to the monitoring apparatus, comparing the transmitted identification codes with the identification codes and fraction of the identification code previously stored and entered in the monitoring apparatus, storing in the monitoring apparatus the full identification code transmitted from the newly installed tire sensor if a sequential portion of the full identification code matches the previously entered fraction thereof, and switching the monitoring apparatus to an operational mode.

6 Claims, 1 Drawing Sheet

METHOD FOR PROGRAMMING NEW SENSOR IN A MOTOR VEHICLE MONITORING SYSTEM

RELATED APPLICATION

The present application is related to U.S. Provisional Application No. 60/987,084 filed Nov. 11, 2007 in the names of the above-identified inventors.

TECHNICAL FIELD

The present invention relates to electronic apparatus for monitoring one or more conditions, such as tire pressure, on a motor vehicle, and more particularly to a method for programming the monitor to accept signals from a newly installed sensor.

BACKGROUND ART

Commercially available tire pressure sensors are adapted to transmit an identifying (ID) code in addition to pressure readings. The ID code has enough alpha-numeric symbols for the sensor's identity to be unique for its useful life. Typically, the ID code is plainly visible on the sensor and/or the packaging accompanying the device. Once the sensor is properly installed on a tire, the tire pressure monitoring apparatus (TPMA) is programmed to recognize the sensor by its ID and thereby associate it with the tire to which it is attached.

In the past, there have been several new sensor programming methods intended to make the TPMA operative. U.S. Pat. No. 6,453,737 discloses a method that requires the correct tire pressure to be in the tire at the time the sensor is attached to the wheel. The sensor ID code and tire pressure are sent to the display together. However, this method does not work very well if the tire pressure sensor is installed inside the wheel or if the sensor is installed before the tire pressure is correctly set. In addition, the foregoing method requires the sensor programming to be conducted when the TPMA is on the motor vehicle.

SUMMARY OF THE INVENTION

The present method integrates data transmitted from a newly installed tire sensor into monitoring apparatus having data from at least one previously integrated tire sensor already stored therein. Each of the newly installed and previously integrated tire sensors periodically transmits a unique identification code. The method basically comprises placing the monitoring apparatus into a programming mode, entering the tire location of the newly installed tire sensor into the monitoring apparatus, entering a fraction of the identification code for the newly installed tire sensor into the monitoring apparatus, placing the monitoring apparatus in a comparing mode, transmitting the identification codes from the newly installed and previously integrated tire sensors to the monitoring apparatus, comparing the transmitted identification codes with the identification codes and fraction of the identification code previously stored and entered in the monitoring apparatus, storing in the monitoring apparatus the full identification code transmitted from the newly installed tire sensor if a sequential portion of the full identification code matches the previously entered fraction thereof, and switching the monitoring apparatus to an operational mode.

DETAILED DESCRIPTION OF EXEMPLARY EMBODIMENT

Figure 1:
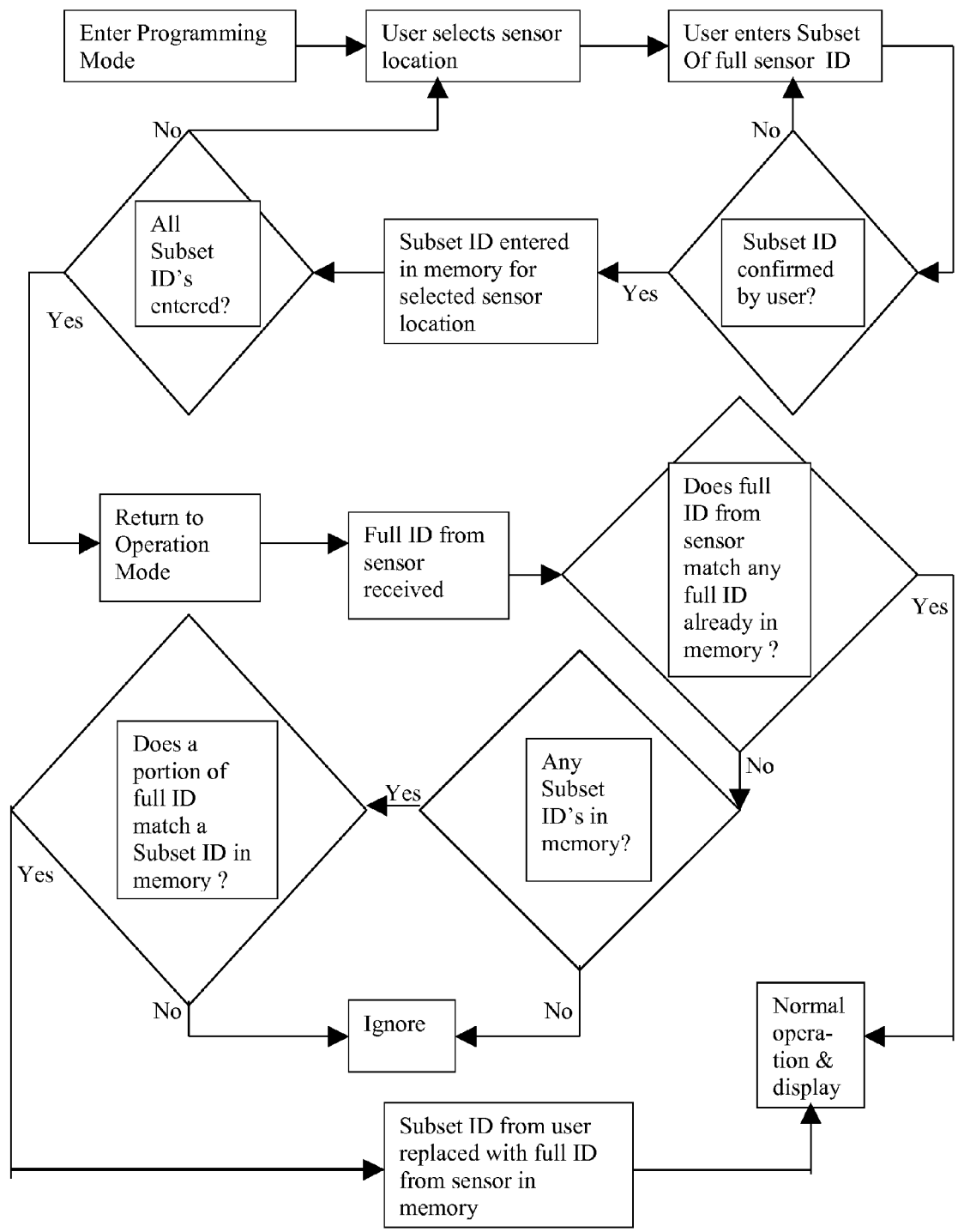
FIG. 1 is a flow chart of an illustrative embodiment of the present programming method.

As illustrated in FIG. 1, the present programming method is designed to remedy the foregoing limitations. The user first places the tire pressure monitoring apparatus (TPMA) in a programming mode, using, for instance, the system's display, keypad or other user input device (not shown) 10. The user then selects the tire upon which the new sensor has or will be mounted and the proper tire pressure or pressure range 12. Next, the user enters a subset or fraction of the full sensor ID such as, for example, the last three alpha-numeric symbols 14. The user confirms the accuracy of the previous entries, and the TPMA enters the fractional ID, tire location and proper pressure into its memory 18. The TPMA then prompts the user to enter the tire location, proper pressure and fractional ID of any additional new sensors 20. The foregoing steps can be taken with or without the user operated portion of the TPMA in the motor vehicle. Once they are completed, the remaining steps are conducted with the user portion of the TPMA in place.

The TPMA then shifts to a comparing mode 22. In this mode, the TPMA receives signals from the tire sensors (and occasionally from elsewhere), which signals include each sensor's full ID code 24. The TPMA then searches its memory to determine if the ID codes received match those already stored in memory 26. If all of the received ID codes match those already in memory, the TPMA shifts to a normal operating mode 28. However, if a new sensor has been installed, there will not be a perfect match between the received ID codes and those already in memory. In this event, the TPMA determines if there are any fractional ID's In its memory 30. If there are not, then the TPMA ignores the received ID code not found in memory 32. It is sometimes the case that the received ID code is from another motor vehicle parked close to the vehicle containing the present TPMA, so ignoring the stray ID code is appropriate. On the other hand, if a fractional ID is found in memory, the TPMA determines if a portion of the received ID code matches the fractional ID in memory 34. If there is no match, the TPMA once again treats the received ID code as a stray and ignores it 32. However, if a portion of the received ID code matches a fractional ID in memory, then the TPMA replaces the fractional ID in memory with the full received ID of the new sensor 36 and then shifts into normal operating mode 28.

In foregoing manner, the TPMA is programmed to recognize and accept the data transmitted by each newly installed sensor.

The invention claimed is:

1. A method of integrating data transmitted from a newly installed tire sensor into monitoring apparatus having data from at least one previously integrated tire sensor stored therein, each of said newly installed and previously integrated tire sensors periodically transmitting a unique identification code, said method comprising:
   a. placing the monitoring apparatus into a programming mode;
   b. entering a tire location of the newly installed tire sensor in the monitoring apparatus;
   c. entering a fraction of the identification code for the newly installed tire sensor in the monitoring apparatus;
   d. placing the monitoring apparatus in a comparing mode;

e. transmitting the identification codes from the newly installed and previously integrated tire sensors to the monitoring apparatus;

f. comparing the transmitted identification codes with the identification codes and fraction of the identification code previously stored and entered in the monitoring apparatus;

g. storing in the monitoring apparatus a full identification code transmitted from the newly installed tire sensor if a sequential portion of the full identification code matches the previously entered fraction thereof; and h. switching the monitoring apparatus to an operational mode.

2. The method according to claim 1, wherein the fraction of the identification code of the newly installed tire sensor entered in the monitoring apparatus is the last three alphanumeric symbols of said identification code.

3. The method according to claim 1, wherein each of the newly installed and previously integrated tire sensors periodically transmits data concerning a pressure of the tire on which it is mounted.

4. The method according to claim 3, and further comprising the steps of entering and storing in the monitor a desired tire pressure value for each tire location.

5. The method according to claim 4, and further comprising the step of confirming that the previous entries of tire location, tire pressure value and fraction of the tire sensor identification are correct before placing the monitoring apparatus in the comparing mode.

6. The method according to claim 1, and further comprising the step of determining if the fraction of the identification code entered in the monitoring apparatus matches any portion of the identification code transmitted by the newly installed tire sensor.

\* \* \* \* \*